United States Patent
McComber

(10) Patent No.: US 6,364,048 B1
(45) Date of Patent: *Apr. 2, 2002

(54) INDEPENDENT SUSPENSION AND DRIVE ARRANGEMENT AND VEHICLES INCORPORATING SAME

(75) Inventor: Donald R. McComber, Littleton, CO (US)

(73) Assignee: The Gates Corporation, Denver, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/328,570

(22) Filed: Sep. 23, 1998

Related U.S. Application Data

(63) Continuation-in-part of application No. 08/902,561, filed on Jul. 29, 1997, now abandoned.

(51) Int. Cl.[7] .................................................. B60K 17/00
(52) U.S. Cl. ........................ 180/350; 180/358; 180/373
(58) Field of Search ................................... 180/337, 217, 180/350, 357, 358, 366, 373

(56) References Cited

U.S. PATENT DOCUMENTS

| | | |
|---|---|---|
| 1,226,632 A | 5/1917 | Bock et al. |
| 1,697,239 A | 1/1929 | Hamilton |
| 2,038,843 A | 4/1936 | Jones |
| 2,980,196 A | 4/1961 | van der Brugghen |
| 3,583,727 A | 6/1971 | Wallis et al. |
| 4,003,443 A | 1/1977 | Boughers |
| 4,065,144 A | 12/1977 | Winchell |
| 4,488,636 A | 12/1984 | DeCoene |
| 4,541,501 A | 9/1985 | Kawasaki |
| 4,614,507 A | 9/1986 | Ishino |
| 4,616,729 A | 10/1986 | Kasai |
| 4,650,026 A | 3/1987 | Shiraishi |
| 4,782,908 A | 11/1988 | Trema |
| 5,343,974 A | 9/1994 | Rabek |
| 5,383,530 A | 1/1995 | Shiohara |
| 5,413,368 A | 5/1995 | Pong et al. |

FOREIGN PATENT DOCUMENTS

| | | |
|---|---|---|
| EP | 61166723 | 7/1986 |
| EP | 0705724 A2 | 4/1996 |
| EP | 08322976 | 10/1996 |
| FR | 1132350 | 3/1957 |
| FR | 1358209 | 11/1964 |
| FR | 2530212 | 1/1984 |
| GB | 1158761 | 7/1969 |

*Primary Examiner*—Paul N. Dickson
(74) *Attorney, Agent, or Firm*—M. S. Olson, Esq.; C. H. Castleman, Esq.; S. G. Austin, Esq.

(57) ABSTRACT

An independent suspension and drive system comprising a transverse power shaft mounted on a vehicle frame and having a differential connection with a power source; at least one pivot shaft mounted on the vehicle frame; at least one cantilevered swing- or trailing- or pivot arms mounted on each of the at least one pivot shafts; at least one drive wheel, one each mounted on each of the respective at least one pivot arms via respective axles; and at least one chain or belt or equivalent member operatively connecting power shaft driver sprockets to respective wheel driven sprockets; wherein the centerline of the power shaft is substantially coincident with the centerline of each of the at least one pivot shafts, and wherein the pivot shafts are independent of the power shaft.

16 Claims, 3 Drawing Sheets

INDEPENDENT SUSPENSION AND DRIVE ARRANGEMENT AND VEHICLES INCORPORATING SAME

This application is a continuation-in-part, of application Ser. No. 08/902,561, filed Jul. 29, 1997, now abandoned.

BACKGROUND OF THE INVENTION

The present invention relates to a suspension and drive arrangement for a driven wheel of a motor vehicle, and more particularly to an independent rear suspension and drive system for a motor vehicle having one or more driven wheels.

Motor vehicles, including two-, three- or four-wheeled vehicles such as certain motorcycles and golf cars, automobiles and larger vehicles incorporating more wheels and wheel axles, are well known to comprise a vehicle frame, an engine mounted thereon, and a suspension and drive system for connecting wheels to the vehicle frame, for minimizing the effects of vibration and vertical displacement due to uneven driving surfaces without significantly impairing the vehicle's handling, and generally for propelling the vehicle. Independent suspension systems in particular allow for the independent vertical displacement of a single wheel in relation to the other wheels.

Many two-wheeled chain-drive vehicles such as certain motorcycles are known to utilize swing- or trailing arms having a generally forked- or "U"-shape, to suspend the rear wheel. Such trailing arms generally incorporate a pivot shaft at the end opposite the wheel for connection to the balance of the suspension and drive system. Vertical displacement of the rear wheel causes the wheel to move in an arc about the pivot shaft axis or centerline. If the pivot shaft axis is offset even a relatively small amount from the transmission output shaft axis however, significant drive length variations may occur. Such variations generally lead to a rough or jumpy drive, and cause wild chain tension variation which ultimately results in drive system damage. Thus there have been several attempts to minimize or eliminate the offset between the trailing arm pivot shaft axis and the transmission output shaft axis in the area of motorcycle suspension and drive system design.

Despite the problems posed by these chain tension variations, trailing arms are attractive for smaller vehicles such as motorcycles because they are low cost in that environment, and they require very little space. In the area of larger, e.g., three- and four-wheeled vehicles such as golf cars, automobiles and trucks however, trailing arms are generally not utilized without additional support due to the high structural stresses presented by such an arrangement, the difficulty in maintaining appropriate camber and caster profiles, the difficulty in accessing the power transmission member for adjustment or replacement thereof, and the difficulty in accessing the tire for adjustment or replacement thereof.

Accordingly, it is a primary object of the present invention to provide a suspension and drive system for a motor vehicle, which utilizes a trailing arm as its primary support of the driven wheel or wheels.

It is a further object of the present invention to provide an independent rear suspension and drive system for a motor vehicle having at least one driven wheel, which utilizes a trailing arm as its primary support of the driven wheel, and wherein the pivot axis of the trailing arm and the rotational axis of the transmission output shaft are substantially coincident.

It is a yet further object of the present invention to provide an independent rear wheel suspension and drive system for a motor vehicle having at least one driven wheel, which utilizes a trailing arm as its primary support of the driven wheel, and which is economical and can bear both the wheel load of such vehicles as well as the high speed rotation of the transmission output shaft.

It is still another object of the present invention to provide an independent rear wheel suspension and drive system for a motor vehicle having at least two laterally opposed rear wheels, which allows for improved access to the drive system's power transmitting member over known suspension and drive systems incorporating trailing arms.

SUMMARY OF THE INVENTION

To achieve the foregoing and other objects and in accordance with a purpose of the present invention as embodied and broadly described herein, a vehicle is provided comprising a vehicle frame; at least one drive wheel; a power source; a suspension and drive system connecting said at least one drive wheel to said frame and connecting said power source to said wheels; wherein the suspension and drive system comprises at least one trailing arm mounted on the vehicle frame and having a first end housing a pivot shaft and a second end operatively connected to one of the at least one wheel. The suspension and drive system furthermore comprises a power shaft transversely journaled in the vehicle frame; at least one power shaft output member operatively connected to the power shaft; at least one drive member operatively connected to one of the at least one wheels; and at least one power transmission member operatively connecting the at least one power shaft output member to the at least one drive member. The at least one pivot shaft is independent of the power shaft and the centerline of the power shaft is substantially coincident with the centerline of the at least one pivot shaft.

In a further embodiment of the present invention, a motor vehicle is provided comprising a vehicle frame, at least two laterally disposed wheels, a power source, a suspension and drive system connecting the wheels to the frame and connecting the power source to the wheels. The suspension and drive system comprises at least two trailing arms, each of which has a first end housing a pivot shaft which is journaled in the vehicle frame, and a second end operatively connected to one of the at least two wheels. The trailing arms are mounted on laterally opposed sides of the vehicle frame. The suspension and drive system further comprises a power shaft which is transversely journaled in the vehicle frame. The power shaft includes a differential, and at least two power shaft output members, the power shaft output members being located one each on either side of the differential. Each of the power shaft output members is operatively connected to a drive member, generally by means of a power transmitting member. Each of the drive member is in turn operatively connected to one of the vehicle's wheels. Each of the trailing arm pivot shafts is independent of the power shaft. What is meant by the term, "independent" in this context, is that the power shaft and the pivot shaft are not physically attached to one another; are in fact separate structures, but are operatively connected to one another by means of the power shaft output members, power transmitting members and drive members. The axis, i.e., centerline, of the power shaft is substantially coincident with the axis, i.e., the centerline, of each of the pivot shafts.

BRIEF DESCRIPTION OF THE DRAWINGS

The accompanying drawings which are incorporated in and form a part of the specification, illustrate preferred embodiments of the invention, and together with a description, serve to explain the principles of the invention. In the several drawings, like numerals designate like parts, and.

DESCRIPTION OF THE PREFERRED EMBODIMENTS

Figure 1:
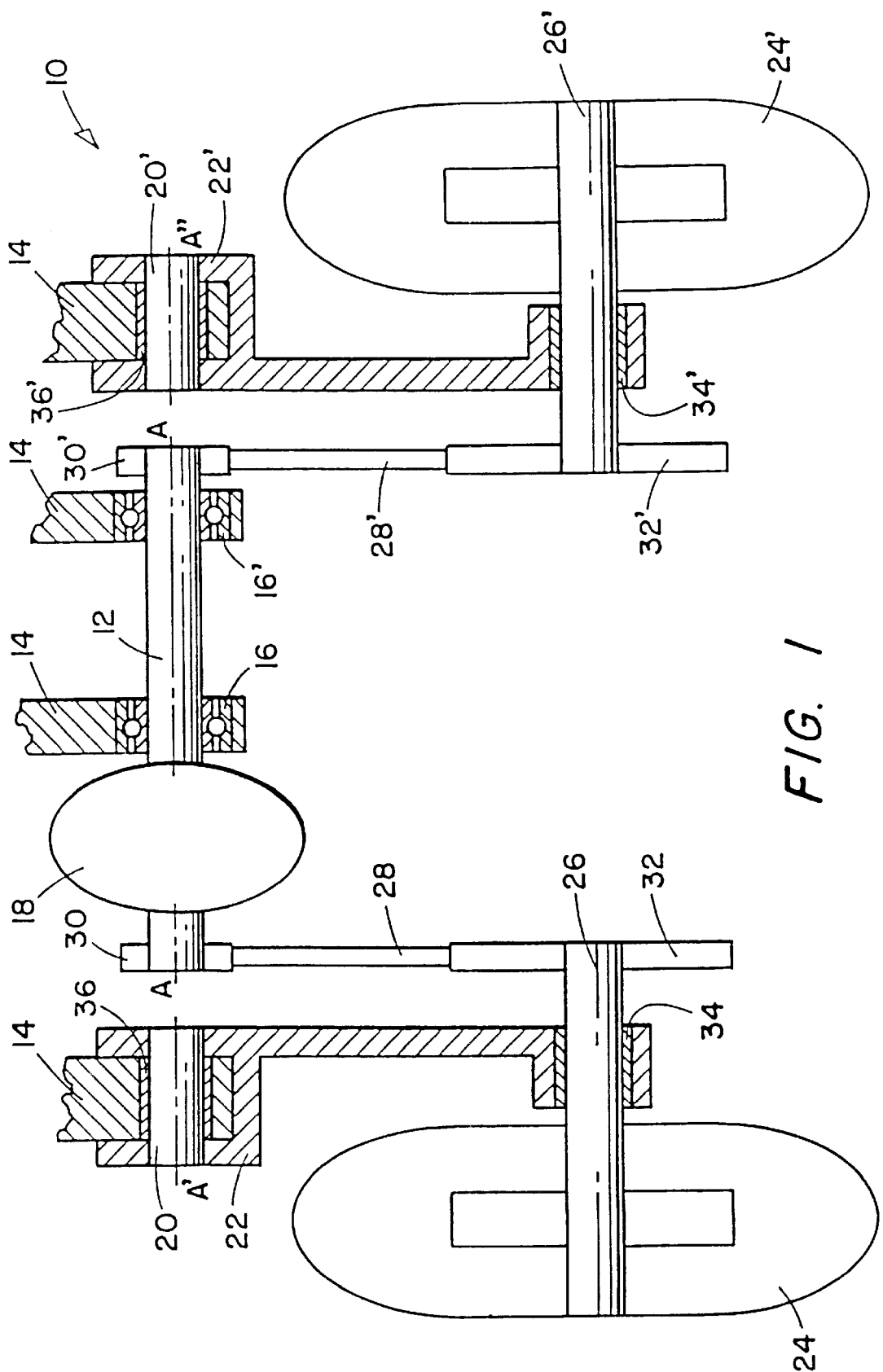
FIG. 1 is a schematic representation of an embodiment of the suspension and drive system of the present invention.

Referring to FIG. 1, a schematic representation of one embodiment of the present invention is shown. In the embodiment shown, an independent suspension and drive system 10 is in the form of an independent rear suspension and drive system and includes a transverse drive- or power shaft 12 mounted on a vehicle frame 14 by means of high speed bearing members 16, 16'. The high speed bearing members 16, 16' should be sufficiently robust to accommodate the high speed rotation typical of motor vehicle drive- or power shafts. Such high speed bearing members are well known in the art, and may include for example roller-ball or needle bearings, and are preferably ball-type bearings.

A differential 18 is located on the power shaft 12 and generally enables each of the laterally opposed wheel axles and wheels to rotate at varying rates as the vehicle corners. A pair of cantilevered swing- or trailing- or pivot arms 22, 22' are connected to the vehicle frame. Pivot shafts 20, 20' located at the fore end of the trailing arms 22, 22' form the connection of the trailing arms 22, 22' to the vehicle frame 14 by means of weight bearing members 36, 36'. These weight bearing members 36, 36' are required to bear only the load of the wheel assemblies and not the high speed rotation of the power shaft, and may therefore be of a relatively simple and inexpensive variety. These types of bearings are also well known to the art, and may include for example, simple pivot bearings and sleeve bearings.

Wheels 24, 24' are mounted upon wheel axles 26, 26', each of which is in turn connected to the remote end of the trailing arms 22, 22' by means of wheel bearing members 34, 34'. Unlike the type of "U"-shaped trailing arms typically used in motorcycles, in which the wheels are mounted on axles extending between forked-type trailing arms, these cantilevered trailing arms 22, 22' have a configuration whereby the wheels are mounted on their outward-facing sides, which allows for lateral removal and replacement of the wheels.

Power shaft output members, shown in FIG. 1 as driver sprockets 30, 30' are mounted on the power shaft 12, one on either side of the differential 18. Drive members, shown in FIG. 1 as driven axle sprockets 32, 32' are mounted one each on the wheel axles 26, 26'. Power transmitting members, shown as power transmission belts 28, 28' operatively connect the driver sprockets 30, 30' to the driven sprockets 32, 32', and form an operative connection between the power shaft 12 on the one hand and the wheel assemblies, i.e., the pivot shafts 20, 20', trailing arms 22, 22', wheel axles 26, 26' and wheels 24, 24', on the other. That is, the trailing arms 22, 22' are not mounted to or journaled in the power shaft 12. This unique configuration allows greater access to the power transmission member; an open space between the respective pivot shafts 20, 20' and the power shaft 12 enables greater ease of adjustment or replacement of the belt or chain or other power transmission members, including a drive shaft for example, compared to known configurations.

As is readily apparent from an inspection of FIG. 1, the axis or centerline A of the power shaft 12 is substantially coincident with the axes or centerlines A', A" of each of the pivot shafts 22, 22', thus virtually eliminating variations in belt tension with vertical pivoting of the wheels. According to this embodiment of the present invention, when subjected to vertical displacement, each wheel 24, 24' moves in an arc about it's respective pivot shaft axis, each of which is substantially coincident with the power shaft axis.

Notably, the embodiment of the present invention described in FIG. 1 requires only about two high speed bearings 16, 16', by virtue of the separation of the trailing arms 22, 22' from the power shaft 12 onto distinct pivot shafts 20, 20'. Because the trailing arms 22, 22' are not mounted directly onto the power shaft 12, the bearings used to form the connection of the trailing arms to the balance of the vehicle need not be capable of bearing the rotation of the power shaft; instead these bearings need only be robust enough to bear the load of the wheel assembly. The ability to use these simple bearings in place of additional high speed bearings throughout the design provides for significant potential cost savings.

The suspension and drive system of the present invention furthermore allows for greater access to the power transmitting member 28, 28' than known suspension systems, due in part to the separation of the power shaft 12 from the pivot shafts 20, 20', which creates a space over the driver sprockets 30, 30' through which one could readily access the power transmission belts 28, 28'.

While the high speed bearing members 16, 16' for attachment of the power shaft 12 to the vehicle frame 14 are shown in FIG. 1 to be located between the driver sprockets 30, 30', it has been found that the power shaft 12 may advantageously possess a relatively small diameter when the connection of the power shaft 12 to the vehicle frame 14 via the high speed bearing members 16, 16' is such that the driver sprockets 30, 30' are instead located between the high speed bearing members 16, 16', and the high speed bearing members 16, 16' are located at either end of the power shaft 12. That is, the attachment points of the power shaft 12 to the vehicle frame 14 via the high sped bearing members 16, 16' are preferably on opposite ends of the power shaft 12. Utilizing this preferred configuration, a golf car having otherwise-conventional dimensions has been successfully built and operated utilizing a power shaft having a diameter of from about ¾ inches (1.9 cm) at its narrowest point to about 1 ⅛ inches (2.9 cm) at its broadest point, and incorporating a belt-drive length of about 13 inches (5.1 cm). Where the high speed bearing members 16, 16' are instead located as illustrated in FIG. 1, a slightly larger diameter power shaft may be required to accommodate the increased load of such configuration.

Figure 2:
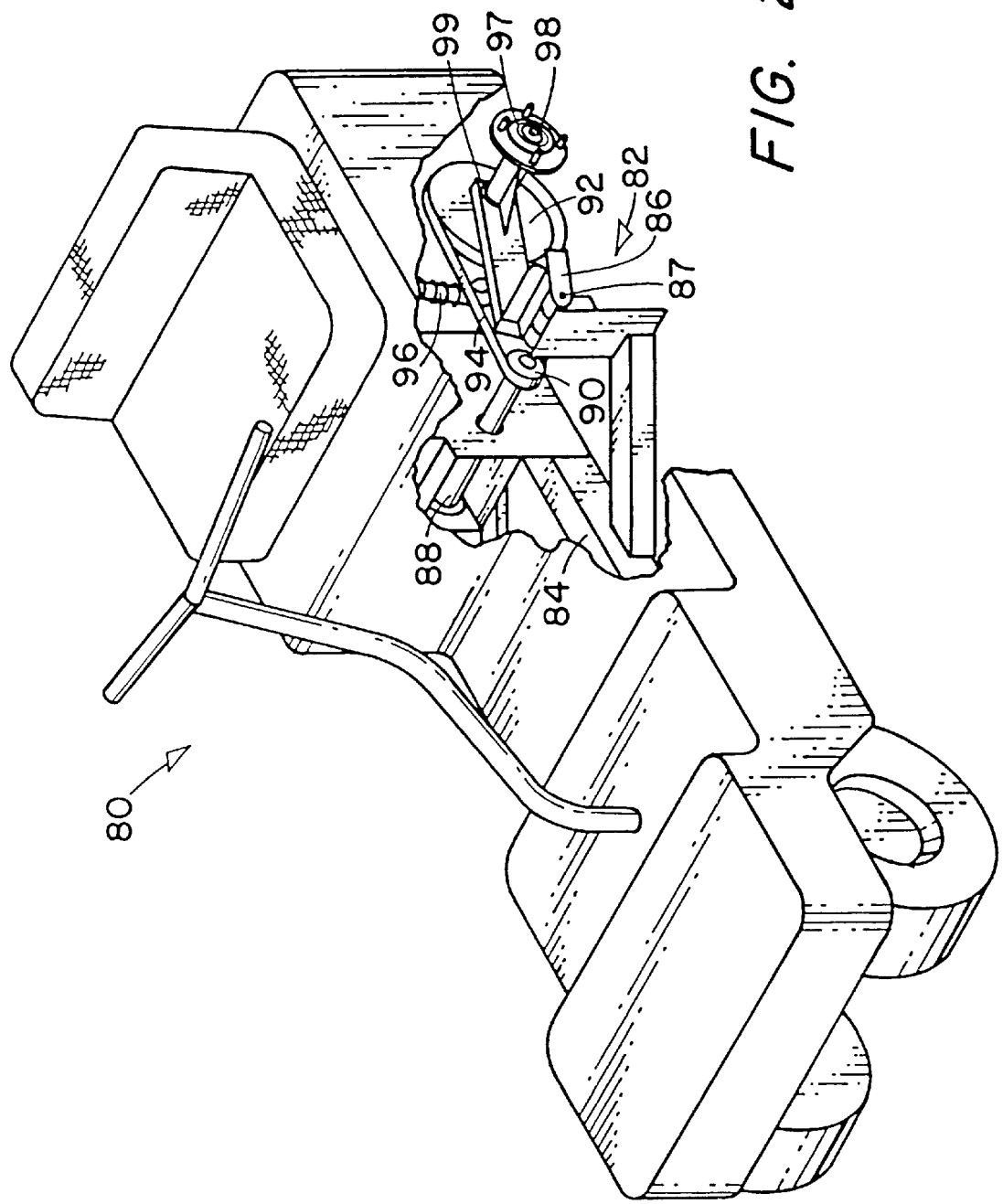
FIG. 2 is a perspective view of an embodiment of the present invention in the form of a golf car, in which a portion is shown in cut-away view to reveal one side of a suspension and drive system of the present invention.
Figure 3:
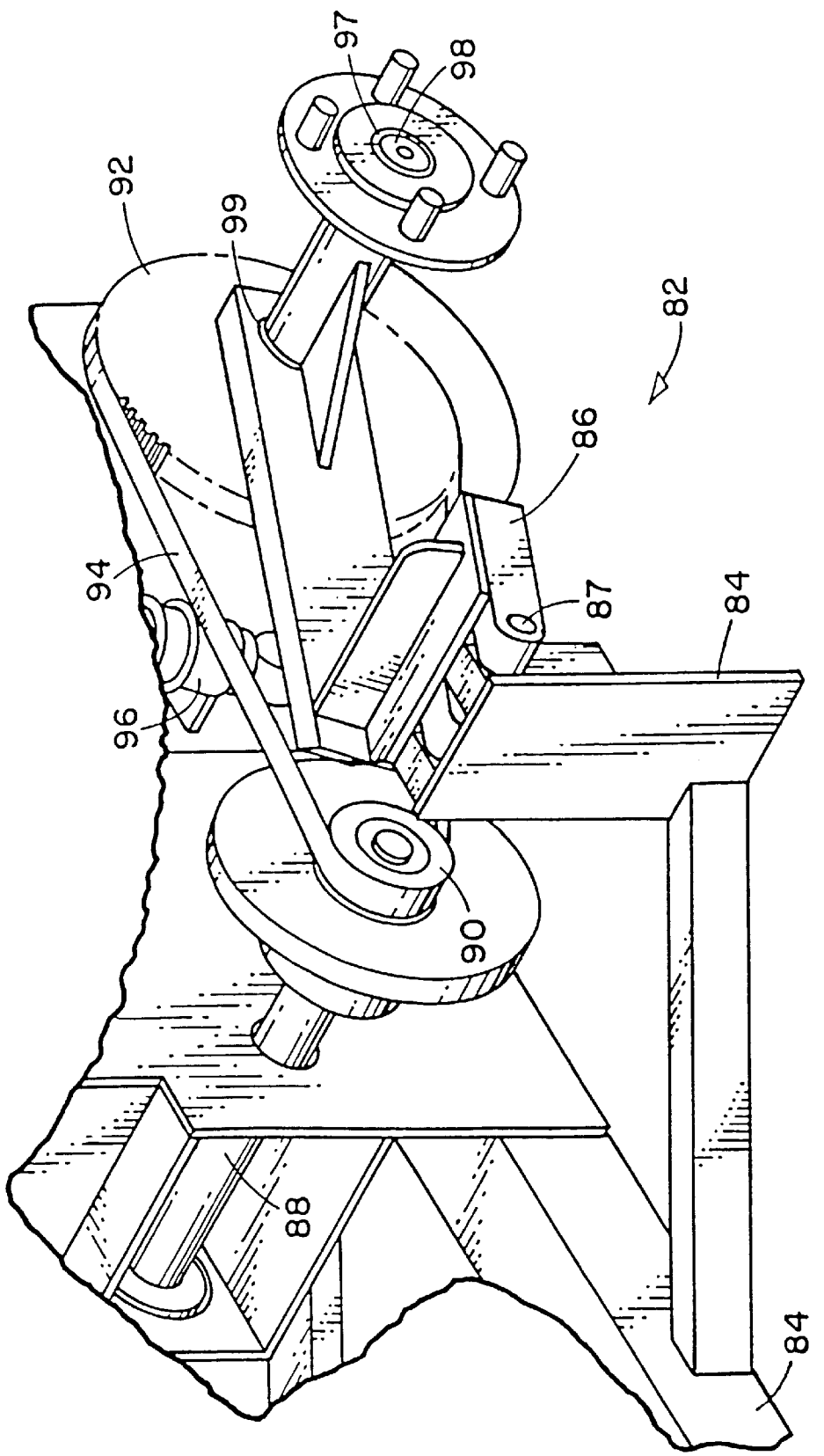
FIG. 3 is an enlarged perspective view of the suspension and drive system shown in FIG. 2.

FIG. 2 shows a preferred embodiment of the present invention in the form of a golf car. The portion surrounding the left rear quadrant of the vehicle has been cut away to reveal approximately the left half of a suspension and drive system of the present invention. As is readily apparent from the discussion above with respect to FIG. 1, for a vehicle having two laterally disposed rear wheels, the right half of the suspension and drive system of the present invention is substantially identical in all relevant respects to it's left half, but is disposed in the opposite direction to accommodate the right rear tire. FIG. 3 shows an enlarged view of the portion of FIG. 2 showing one embodiment of the suspension and drive system of the present invention.

In the drawings, the independent suspension and drive system 82 is utilized as the independent rear suspension and drive system of a golf car 80, shown generally, and includes a transverse drive- or power shaft 88 mounted on a vehicle frame 84. A differential (not shown) of any suitable configuration would normally be located on the power shaft 88 to enable each of the laterally opposed wheel axles and wheels to rotate at varying rates as the vehicle corners. A pair of cantilevered trailing arms 86, the left such arm being shown, are connected to the vehicle frame 84. Pivot shafts 87, the left such shaft being shown, are located at the fore end of the trailing arms 86, at the point of connection of the trailing arms 86 to the vehicle frame 84.

A pair of wheels (not shown) are mounted upon wheel axles 98, the left such axle being shown, each of which is in turn mounted via wheel bearings 97, 99 on the aft end of the trailing arms 86, on the outward facing side thereof. Power shaft output members, shown in FIGS. 2 and 3 as driver sprockets 90, are mounted on the power shaft 88. Drive members, shown in FIGS. 2 and 3 as driven axle sprockets 92 are mounted one each on the wheel axles 98, such that the aft end of the trailing arm 86 is disposed between the driven sprocket 92 and the wheel (not shown). Power transmitting members, shown as synchronous power transmission belts 94 operatively connect the driver sprockets 90 to the driven sprockets 92, and form an operative connection between the power shaft 88 on the one hand and the wheel assemblies, i.e., the wheel axles 98 and wheels (not shown), on the other.

As can be readily seen in FIGS. 2 and 3, the centerline of the power shaft 88 is substantially coincident with the centerlines of the pivot shafts 87, thus substantially eliminating variations in belt tension. According to the present embodiment, when subjected to vertical displacement, the wheels move in an arc about the pivot shaft axis, which is designed to be substantially coincident with the power shaft axis. In a preferred embodiment, the centerlines of the power shaft and pivot shafts are within about 4 cm of one another, more preferably within about 2 cm of one another, and most preferably within about 0.5 cm of one another. In a more preferred embodiment of the present invention, the offset between the centerlines is no more than about 1% based on the chain- or belt drive length, and is more preferably not greater than about 0.1%, based on the chain- or belt drive length. One skilled in the relevant art would readily appreciate that the chain- or belt drive length is conventionally measured from the centerline of the drive- or power shaft to the centerline of the wheel axle.

As one of ordinary kill in the art would readily recognize, a golf car or any other vehicle falling within the scope of the present invention as claimed, would also include the components generally needed or desired to complete the vehicle, such as a shock absorber 96 or equivalent, a chassis, an engine, motor or other power source, a front wheel assembly, a driver and passenger seat, etc.

By substantially eliminating chain- or belt tension variation in the type of vehicle shown in FIG. 2, the jumpy or otherwise unstable ride accompanying such variation is also substantially eliminated. A preferred use of the claimed suspension and drive system is in an independent transportation vehicle for the physically disabled, wherein ride stability is of paramount importance for driver safety and comfort. In a further preferred embodiment, the claimed suspension and drive system is utilized in a golf car for the physically disabled.

By locating the transmission output member at the pivot axis of the arc made when the vehicle wheel is vertically displaced, the present invention provides a substantially constant distance form the transmission output member to the driven member, and likewise a substantially constant chain or belt tension. By separating the connection points of the trailing arms from the drive- or power shaft, the present invention provides a suspension and drive system which allows for the use of a trailing arm as the primary wheel suspension component of a motor vehicle, which may include motorcycles, leisure vehicles including golf cars, vehicles for the physically disabled, automobiles and even heavier vehicles such as trucks. Moreover, the present invention provides such a benefit at a significantly lower cost than trailing arm configurations presently available, due primarily to the claimed unique design which allows for the use of a minimum of high speed bearings compared to known configurations. Finally, the unique arrangement of components of the present invention allows for improved access to both the vehicle wheels, and the transmission output members, power transmitting members and driven members compared to known suspension and drive systems.

Although the present invention has been described in detail for the purpose of illustration, it is to be understood that such detail is solely for that purpose and that variations can be made therein by one skilled in the art without departing from the spirit or scope of the present invention except as it may be limited by the claims. The invention disclosed herein may suitably be practiced in the absence of any element which is not specifically disclosed herein.

What is claimed is:

1. A vehicle comprising a vehicle frame, at least one drive wheel mounted upon a wheel axle, a power source, a suspension and drive system connecting said at least one drive wheel and axle to said frame and connecting said power source to said at least one wheel and axle, and characterized in that:
    a) said suspension and drive system comprises at least one trailing arm, said at least one trailing arm having a first end housing a pivot shaft and a second end operatively connected to one of said at least one wheel, said trailing arm being mounted on said vehicle frame; and
    b) said suspension and drive system comprises a power shaft transversely journaled in said vehicle frame; at least one power shaft output member operatively connected to said power shaft; at least one drive member operatively connected to one of said at least one wheels; and at least one power transmission member operatively connecting said at least one power shaft output member to said at least one drive member; and
wherein said pivot shaft is laterally separated from said power shaft and the centerline of said power shaft is substantially coincident with the centerline of said pivot shaft.

2. The vehicle of claim 1 wherein said at least one trailing arm is cantilevered.

3. The vehicle of claim 1 wherein said at least one power shaft output member, said at least one power transmission member and said at least one drive member are in the form of driver sprockets, power transmission belts, and driven sprockets, respectively.

4. The vehicle of claim 2, wherein all of the at least one power shaft output member, power transmission belt and drive member are located along the side of the at least one trailing arm facing the vehicle.

5. The vehicle of claim 2 wherein said at least one wheel is mounted on the side of the trailing arm facing away from the vehicle.

6. The vehicle of claim 1 wherein the centerline of the pivot shaft is within about 0.5 cm of the centerline of the power shaft.

7. The vehicle of claim 1 wherein the centerline of the pivot shaft is within about 0.1% of the centerline of the power shaft, based on the distance from the centerline of the power shaft to the centerline of the wheel axle.

8. A vehicle comprising a vehicle frame, at least two laterally disposed wheels, each said wheel being mounted upon a wheel axle, a power source, a suspension and drive system connecting said at least two wheels and axles to said frame and a drive system connecting said power source to said wheels and axles, and characterized in that:
   a) said suspension and drive system comprises a first and a second trailing arm, each said trailing arm having a first end housing a pivot shaft and a second end operatively connected to one of said at least two wheels, said trailing arms being mounted on laterally opposed sides of said vehicle frame; and
   b) said suspension and drive system comprises a power shaft transversely journaled in said vehicle frame, a differential on said power shaft, a first and a second power shaft output member, said first power shaft output member being located on a first side of said differential and said second power shaft output member being located on a second side of said differential, said output members being operatively connected to said power shaft; a first and a second drive member, each said drive member being operatively connected to one of said at least two wheels; at least two power transmission members, each said power transmission member operatively connecting one of said first or second power shaft output members to said drive members; and
wherein each of said pivot shafts is laterally separated from said power shaft and the centerline of said power shaft is substantially coincident with the centerline of each of said pivot shafts.

9. The vehicle of claim 8 wherein said trailing arms are cantilevered.

10. The vehicle of claim 8 wherein said power shaft output members, said power transmission members and said drive members are in the form of driver sprockets, power transmission belts, and driven sprockets, respectively.

11. The vehicle of claim 9 wherein all of the respective power shaft output members, power transmission belts and drive members are located along the sides of the trailing arms facing the vehicle.

12. The vehicle of claim 9 wherein each said at least two wheels is mounted on the sides of the trailing arms facing away from the vehicle.

13. The vehicle of claim 8 wherein each of the centerlines of the respective pivot shafts is within about 0.5 cm of the centerline of the power shaft.

14. The vehicle of claim 8 wherein said vehicle is in the form of a golf car.

15. The vehicle of claim 8 wherein said vehicle is in the form of a golf car for the physically disabled.

16. The vehicle of claim 8 wherein each of the centerlines of the respective pivot shafts is within about 0.1% of the centerline of the power shaft based on the distance from the centerline of the power shaft to the centerline of the wheel axle.

* * * * *

UNITED STATES PATENT AND TRADEMARK OFFICE
CERTIFICATE OF CORRECTION

PATENT NO. : 6,364,048 B1
DATED : April 2, 2002
INVENTOR(S) : McComber, Donald R.

It is certified that error appears in the above-identified patent and that said Letters Patent is hereby corrected as shown below:

<u>Column 4,</u>
Lines 52-53, delete "(5.1 cm)" and insert -- (33 cm) --

Signed and Sealed this

Eighth Day of April, 2003

JAMES E. ROGAN
*Director of the United States Patent and Trademark Office*